United States Patent [19]

Edwards

[11] Patent Number: 4,984,148

[45] Date of Patent: Jan. 8, 1991

[54] TWO-PHASE BANG-BANG CURRENT CONTROL SYNCHRONIZER

[75] Inventor: Charles W. Edwards, Monroeville, Pa.

[73] Assignee: Westinghouse Electric Corp., Pittsburgh, Pa.

[21] Appl. No.: 529,843

[22] Filed: May 29, 1990

[51] Int. Cl.$^5$ .............................................. H02M 3/24
[52] U.S. Cl. ........................................ 363/95; 363/97; 363/124
[58] Field of Search ............................. 363/95, 124, 97

[56] References Cited

U.S. PATENT DOCUMENTS

| | | | |
|---|---|---|---|
| 4,032,833 | 6/1977 | Ibamato et al. | 363/78 |
| 4,259,620 | 3/1981 | Oates et al. | 318/802 |
| 4,366,531 | 12/1982 | Karadsheh et al. | 363/57 |
| 4,384,321 | 5/1983 | Rippel | 363/124 |
| 4,433,370 | 2/1984 | Karadsheh et al. | 363/124 |
| 4,562,527 | 12/1985 | Klamt | 363/89 |
| 4,634,943 | 1/1987 | Reick et al. | 318/432 |
| 4,667,283 | 5/1987 | Seki et al. | 363/95 |
| 4,748,397 | 5/1988 | Ogawa et al. | 323/222 |

OTHER PUBLICATIONS

IEEE Transactions on Industriale Electronics and Control Instrumentation, vol. IECI-24, No. 4, Nov. 1977, "Static Inverter with Synchronous Output Waveform Synthesized by Time-Optimal-Response Feedback", by Andress Kernick et al., pp. 297-305.

"Time Optimal Response Control of a Two-Pole Single-Phase Inverter", by Manvel A. Geyer and Andress Kernick, pp. 1-9.

Energy 70, 5th, IECEC, Las Vegas, Nev., Feb. 23, 1970, "A Time-Optimal Response Inverter", by Manvel A. Geyer and Andress Kernick, pp. 1-5.

IECEC, Las Vegas, Nev., Sep. 23, 1970, "An Ideal Unit for a Modular Inverter", by Manvel A. Geyer and Andress Kernick, pp. 140-152.

Electronic Design, Jul. 25, 1985, *Design Entry*, "Bang-Bang Controller IC", by Redfern, pp. 131-134.

Primary Examiner—Steven L. Stephan
Assistant Examiner—Bruce Dunn

[57] ABSTRACT

A two-phase bang-bang current control synchronizer for synchronizing two current streams which pass within a hysteresis controller. Synchronization occurs by summing a fixed hysteresis threshold voltage from a master chopper and a sawtooth wave voltage corresponding to a synchronization and outputting a summed signal to an integrator controller which integrated the summed signal and outputs an intergrates signal. A synchronization circuit receives the integrated signal and generates a sawtooth waveform corresponding to an average value of the fixed hysteresis threshold voltage. The sawtooth waveform is fed to the slave chopper and synchronizes the master chopper and the slave chopper.

5 Claims, 1 Drawing Sheet

TWO-PHASE BANG-BANG CURRENT CONTROL SYNCHRONIZER

BACKGROUND OF THE INVENTION

(1) Field of the Invention

The present invention is directed to a two-phase bang-bang current control synchronizer for use with a hysteresis controller including a power chopper. The two-phase bang-bang current control synchronizer synchronizes two current streams which pass through the controller. The synchronizer is used in connection with, for example, a solar inverter, to minimize the amount of current ripple which enters the inverter.

(2) Description of the Related Art

Prior art control systems for a power chopper require reference timing signals to initiate the start of a chopper cycle and turn the power chopper ON. The chopper is turned OFF by a demand signal which is indicative of how much current is necessary for the device to operate. Systems of this type do not require a control loop which has a bandwidth that is as high as a bang-bang controller because they use timing pulses for synchronization. A high bandwidth is necessary to provide a good dynamic response under transient conditions. These timing pulses provide a fixed timing reference voltage in a chopper but require additional circuitry to determine when to turn OFF the fixed timing reference pulses.

In locations in which there is no utility power, electricity is sometimes derived from solar power. Uninterruptible power supply systems have been used to convert the output from solar cells into usable energy. Uninterruptible power supplies, however, are not packaged for environments in which corrosive conditions such as pollution, humidity, heat, salt, air, and wind are present. These environments corrode the inverters and lead to failures. Using low and variable battery voltages in solar power systems overcome some of the drawbacks of the uninterruptible power supply but make direct inversion inefficient.

Hysteresis controllers have been used with a two-phase step-up chopper to control the chopper cycle. The step-up chopper improves the efficiency of the chopper and reduces peak current in the device. Hysteresis controllers have two threshold levels—an upper voltage threshold level and a lower voltage threshold level. An input current and a feedback current input to the hysteresis controller vary between the hysteresis controller levels where they reach, or "bang" against one threshold level, reverse direction until they reach or "bang" against the other threshold level and again reverse direction and repeat the cycle. With two phase chopper controllers employing this method, the input current and the feedback current tend to drift out of synchronization with each other due to slight variations in the circuit parameters.

SUMMARY OF THE INVENTION

The present invention has been designed to overcome the problems related to using fixed timing pulses, using uninterruptible power supplies, and compensating for current drift in a hysteresis controller.

Another object of the present invention is to provide a synchronizer for synchronizing auxiliary waveforms with a control waveform to minimize the amount of current ripple which enters an inverter.

Another object of the present invention is to provide a synchronizer to keep currents input to a hysteresis controller in synchronization with each other without using separate timing pulses, thus maintaining a high bandwidth.

The above and other objects of the present invention are obtained by providing a two-phase bang-bang current control synchronizer comprising a master chopper circuit which generates a fixed hysteresis threshold voltage and a slave chopper circuit for providing a ramped threshold voltage. An integral controller circuit generates a sawtooth wave having the same average value as the fixed hysteresis threshold voltage.

In a preferred embodiment, the integral controller circuit comprises a summer circuit for receiving the fixed hysteresis threshold voltage from the master chopper and the sawtooth threshold, and outputting a summed signal. The integral controller circuit also includes an integral controller for receiving and integrating the summed signal from the summer circuit and outputting an integrated signal. A synchronization circuit receives the integrated signal and generates the sawtooth wave corresponding to an average value of the fixed hysteresis threshold voltage. The sawtooth wave is input to the slave chopper circuit for synchronizing the current waveform The output from the synchronization circuit is a ramp which has one edge synchronized with the change from positive slope to negative slope of the master chopper current. Therefore, an auxiliary waveform is formed in the slave chopper which is synchronized with the waveform from the master chopper. The output waveform tends to stay in synchronization because if it tends to advance in phase, the frequency increases because the threshold difference is smaller. If the slave tends to retard in phase, the frequency is lowered since the threshold difference is larger. This negative feedback effect causes the waveform to say in synchronization.

These objects, together with other objects and advantages, which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENT

Figure 1:
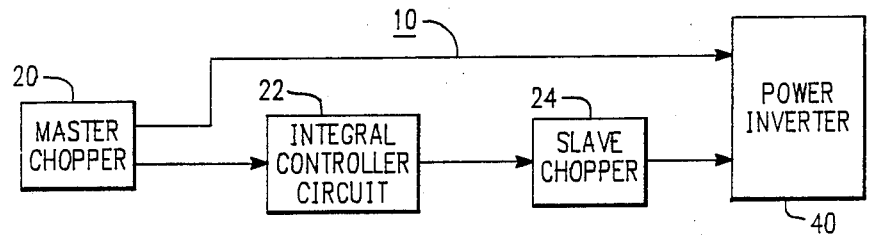
FIG. 1 is a block diagram of a two-phase bang-bang current control synchronizer according to the present invention.

Referring to FIG. 1, a current control synchronizer 10 synchronizes two current streams from a master chopper 20 and a slave chopper 24, respectively, to reduce the amount of current ripple in the current control synchronizer 10. The current control synchronizer 10 includes the master chopper 20, an integral controller circuit 22 and the slave chopper 24. The master chopper 20 in the present invention is a free running chopper which can comprise, for example, a step-up chopper, a buck chopper, or a buck boost chopper. The master chopper can develop, for example, a 400 volt direct current link. The current control synchronizer 10 employs a bang-bang control system to maintain a high bandwidth and lower net current ripple.

The two-phase bang-bang current control synchronizer 10 operates from four battery voltages, e.g., 48 volts, 110 volts, 120 volts and 240 volts. The two-phase chopper is employed to step the battery voltage up to 400 volts to increase the operating efficiency of the power inverter 40 and to reduce the maximum current handling capability required in the power inverter 40. This is because deviations in the current are limited when a heavy load is applied to or released from the power inverter 40. A heavy load would be anything over three times the power inverters nominal rating.

FIG. 1 is a block diagram of a two-phase bang-bang current control synchronizer 10 embodying the present invention. FIG. 1 illustrates a master chopper 20 which applies an ON/OFF pulse to a power inverter 40 to turn ON and OFF the power inverter on line a, and a fixed hysteresis threshold voltage to an integral controller circuit 22 on line b. The integral controller circuit 22 provides a sawtooth waveform signal having the same average value as the fixed hysteresis threshold voltage. A slave chopper 24 outputs a ramped threshold voltage to the power inverter 40.

Figure 2:
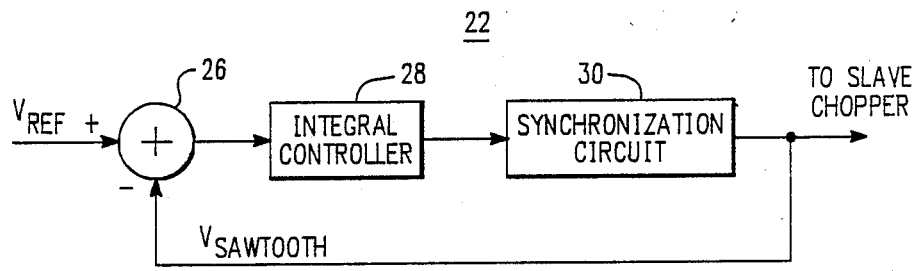
FIG. 2 is a circuit diagram of a slave chopper portion of the two-phase bang-bang current control synchronizer shown in FIG. 1.

An embodiment of the integral controller circuit 22 is shown in FIG. 2. In FIG. 2, a summer 26, integral controller 28 and synchronization circuit 30 are connected as a negative feedback control circuit. The summer 26 receives the fixed hysteresis threshold voltage from the master chopper 20 and the sawtooth waveform signal $V_{sawtooth}$. The integral controller 28 provides an output corresponding to an integration of the output from the summer 26. The synchronization circuit 30 receives the integrated signal and generates a synchronization sawtooth waveform signal corresponding to an average value of the fixed hysteresis threshold voltage. This synchronization sawtooth waveform signal is then input to the slave chopper 24 to synchronize the slave chopper 24 with the master chopper 20. Synchronization of the master chopper 20 and slave chopper 24 is accomplished by adjusting the hysteresis level of one of the choppers to keep the two chopper currents synchronized with each other. Because of the synchronization, the current ripple is minimized and there is reduced beating between choppers.

Figure 3:
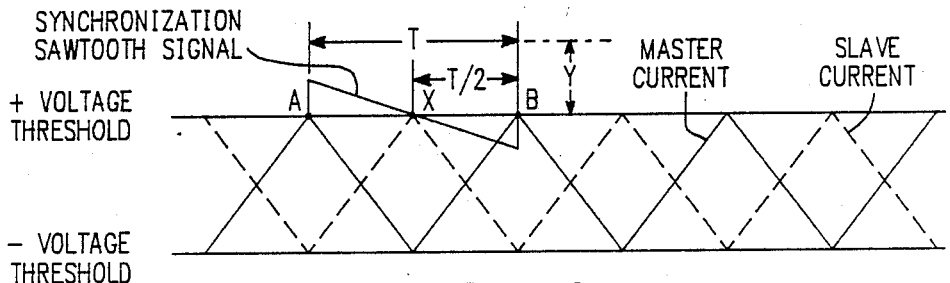
FIG. 3 is a waveform diagram showing the synchronized waveform obtained by the integral controller circuit in FIG. 2 of the present invention.
Figure 4:
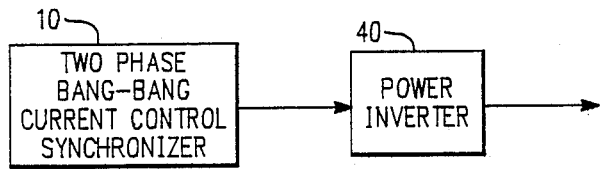
FIG. 4 is a block diagram of a power inverter which employs a two-phase bang-bang current control synchronizer according to the present invention.

FIG. 3 is a waveform diagram of the synchronized waveform obtained by the integral controller circuit 22 in FIG. 2. The synchronized waveform has two threshold levels—an upper threshold level (+threshold) and a lower threshold level (−threshold). The two waveforms are representative of currents in the master chopper 20 and the slave chopper 24. The two waveforms vary between the upper and lower threshold levels where they reach or "bang" against one of the threshold levels reversing direction until they reach the other threshold level and repeat the cycle. The two-phase bang-bang current control synchronizer 10 of the present invention maintains synchronization of the waveforms despite variations in the circuit parameters. The synchronization is accomplished by synchronizing the synchronization sawtooth waveform signal, having a phase shift equal to T/2, where T is the period of the master chopper, with the signal from the master chopper 20. By shifting the phase of the synchronization sawtooth waveform signal by T/2, ripple current is minimized. This is because the sum of the master chopper current and the slave chopper current has a lower peak-to-peak amplitude and a frequency twice as high as each separate current from the choppers 20 and 24.

The synchronization sawtooth waveform signal starts at point A and resets at point B, as shown in FIG. 3. The period between point A and point B is equal to T. The mid-point of the synchronization sawtooth signal is set to cross the threshold level of the master chopper at point X. At the point where the master chopper current changes from rising to falling, the synchronization sawtooth signal is rapidly forced to a predetermined level above the upper current threshold as shown by Y in FIG. 3. The waveforms in FIG. 3 are achieved as follows.

The integral controller circuit 22 in FIG. 1 forces the average value of the synchronization sawtooth signal to have the same value as the fixed hysteresis threshold voltage from the master chopper 20. This is achieved by inputting a reference voltage from the master chopper 20 and the sawtooth signal to the summer 26 (FIG. 2) in the integral controller circuit 22. The slave chopper current varies between the lower threshold level which is fixed and the upper threshold level which is determined by the synchronization sawtooth signal The output of summer 26 is integrated by the integral controller 28 (FIG. 2) which outputs an error signal. That is, the integral controller 28 determines the average value of a slope of the summer 26 output. The average slope value is very close to that of the hysteresis threshold voltage from the master chopper 20. The integral controller 28 outputs a corresponding signal to the synchronization circuit 30.

The input to the synchronization circuit 30 arbitrarily forces the sawtooth wave signal above the fixed hysteresis threshold voltage from the master chopper 20 as shown in FIG. 3. The synchronization circuit then outputs a synchronization sawtooth waveform signal as shown in FIG. 3 that has a level forced above the fixed threshold level. The rate of decay of this signal is determined by the output of the integral controller 28. The synchronizing sawtooth waveform signal has one edge that is synchronized with the master chopper 20 as shown in FIG. 3. This signal is also used as a threshold for the slave chopper 24 which includes the hysteresis controller (not shown).

Because of this synchronization, the master chopper current signal and the slave chopper current signal naturally tend to stay in synchronization. This is true even if the slave chopper 24 and master chopper 20 oscillate at a slightly different frequencies. That is, if the slave chopper 24 tends to oscillate at a slightly lower frequency with the same thresholds as the master chopper 20, then the current signals will intersect the synchronization sawtooth signal later and at a lower level. This reduces the distance that must be traversed, increases the frequency of the current signals, and maintains synchronization. The opposite is true if the slave chopper 24 operates at a higher frequency due to circuit parameter variations. Therefore, the current control synchronizer 10 self-adjusts by employing a negative feedback type arrangement. The current control synchronizer 10 also maintains synchronization between the outputs of the master chopper 20 and the slave chopper 24 despite variations in circuit parameters.

The master chopper 20, slave chopper 24, and integral control circuit 22, including the summer 26, integral controller 28, and synchronization circuit 30, are all conventional devices. The arrangement of these elements in accordance with the present invention provides synchronization not previously obtainable. Although the arrangement discussed above is a two-phase arrangement, the present invention can be employed in devices which have more phases and more choppers. For instance, the ramped threshold voltage of the slave chopper in a three-phase device would have one phase offset by 120° rather than 180° from the other phase, and the third phase would be delayed 240° which would triple the frequency and result in even smaller ripple.

The foregoing is considered as illustrative only of the principals of the present invention. Further, since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

I claim:

1. A two-phase bang-bang current control synchronizer, comprising:
   master chopper means for generating a fixed hysteresis threshold voltage having an average value;
   integral controller means for generating a synchronizing sawtooth signal having an average value substantially the same as the average value of said fixed hysteresis threshold voltage; and
   slave chopper means for generating a ramped threshold voltage in accordance with said synchronizing sawtooth signal having the same average value as said fixed hysteresis threshold voltage.

2. A two-phase bang-bang current control synchronizer according to claim 1, wherein said integral controller means comprises:
   summer means for receiving said fixed hysteresis threshold voltage from said master chopper means and said synchronizing sawtooth signal, and outputting a summed signal varying in response to said synchronizing sawtooth signal;
   an integral controller, operatively connected to said summer means, for receiving and integrating the summed signal and outputting an integrated signal responsive to said summed signal; and
   synchronization means, for receiving the integrated signal and generating said synchronizing sawtooth signal, for controlling said ramped hysteresis threshold voltage based on said synchronizing sawtooth signal and said fixed threshold voltage.

3. A two-phase bang-bang current control synchronizer according to claim 2, wherein said integral controller includes means for providing the integrated signal so as to cause the average value of said synchronizing sawtooth signal to be the same as said fixed hysteresis threshold voltage from said master chopper.

4. A two-phase bang-bang current control synchronizer according to claim 3, wherein said synchronization means includes means for forcing said synchronizing sawtooth signal above said fixed threshold voltage of said master chopper, and controlling the rate of decay of said synchronizing sawtooth signal in accordance with the output from said integral controller.

5. A two-phase bang-bang current control synchronizer, comprising:
   master chopper means for generating a fixed hysteresis threshold voltage;
   integral controller means, for generating a synchronizing sawtooth signal having an average value substantially the same as the average value of said fixed hysteresis threshold voltage, said integral controller means comprising:
   summer means for receiving the fixed hysteresis threshold voltage from said master chopper means and the synchronizing sawtooth signal, and for outputting a summed signal varying in response to the synchronizing sawtooth signal;
   an integral controller, operatively connected to said summer means, for receiving and integrating the summed signal and outputting an integrated signal responsive to said summed signal; and
   synchronization means for receiving the integrated signal and generating the synchronizing sawtooth signal responsive to said integrated signal; and
   slave chopper means, operatively connected to said integral controller means, for generating a ramped threshold voltage in response to the synchronizing sawtooth signal from said integral controller, and the fixed threshold voltage, the output from said slave chopper and said master chopper being input to a power inverter.

* * * * *